United States Patent
Kolhouse et al.

(10) Patent No.: US 11,008,952 B2
(45) Date of Patent: May 18, 2021

(54) VACUUM AND COMPRESSION RELEASE BRAKING IN SPARK-IGNITED ENGINES

(71) Applicant: Cummins Inc., Columbus, IN (US)

(72) Inventors: J. Steven Kolhouse, Columbus, IN (US); Anshul Shambhav, Glenview, IL (US); Thomas M. Yonushonis, Columbus, IN (US); Adrian P. Dale, Columbus, IN (US); Samuel C. Geckler, Columbus, IN (US); David J. Stroh, Columbus, IN (US); Adam C. Cecil, Columbus, IN (US); Anthony Kyle Perfetto, Columbus, IN (US); Ryan Edward Schultz, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/450,146

(22) Filed: Jun. 24, 2019

(65) Prior Publication Data
US 2020/0018244 A1 Jan. 16, 2020

Related U.S. Application Data

(60) Provisional application No. 62/698,514, filed on Jul. 16, 2018.

(51) Int. Cl.
| | |
|---|---|
| *F02D 13/04* | (2006.01) |
| *F01L 13/06* | (2006.01) |
| *F02D 13/02* | (2006.01) |
| *F01L 13/00* | (2006.01) |

(52) U.S. Cl.
CPC ............ *F02D 13/04* (2013.01); *F01L 13/065* (2013.01); *F02D 13/0219* (2013.01); *F01L 2013/111* (2013.01); *F02D 2200/602* (2013.01)

(58) Field of Classification Search
CPC ................. F02D 13/04; F02D 13/0219; F02D 2200/602; F02D 41/021; F02D 2200/702; F02D 2200/70; F02D 41/0005; F01L 13/065; F01L 2013/111
See application file for complete search history.

(56) References Cited

U.S. PATENT DOCUMENTS

| | | | |
|---|---|---|---|
| 3,667,579 A | 6/1972 | Vizza | |
| 4,009,695 A * | 3/1977 | Ule | F01L 9/02 123/90.13 |
| 5,076,059 A | 12/1991 | Okada | |
| 5,088,460 A | 2/1992 | Echeverria | |

(Continued)

FOREIGN PATENT DOCUMENTS

| | | | | |
|---|---|---|---|---|
| DE | 102013009477 A1 * | 12/2014 | ............ | F02P 5/1508 |
| WO | 20170105458 | 6/2017 | | |

*Primary Examiner* — Joseph J Dallo
(74) *Attorney, Agent, or Firm* — Taft Stettinius & Hollister LLP

(57) ABSTRACT

An internal combustion engine system includes an engine with a plurality of pistons housed in respective ones of a plurality of cylinders, an air intake system to provide air to the plurality of cylinders through respective ones of a plurality of intake valves, an exhaust system to release exhaust gas from the plurality of cylinders through respective one of a plurality of exhaust valves. The internal combustion engine uses vacuum braking and/or compression release braking in response to one or more braking conditions.

20 Claims, 5 Drawing Sheets

(56) References Cited

U.S. PATENT DOCUMENTS

| | | | |
|---|---|---|---|
| 6,530,862 B2 | 3/2003 | Kolmanovsky | |
| 7,000,587 B1 | 2/2006 | Hawkins | |
| 2008/0041336 A1* | 2/2008 | Gibson | F02D 41/123 123/322 |
| 2011/0100013 A1* | 5/2011 | Whitney | F02D 41/1497 60/706 |
| 2011/0120422 A1* | 5/2011 | Hou | F02D 13/0246 123/493 |
| 2012/0179357 A1* | 7/2012 | Phillips | F02N 11/0837 701/112 |
| 2015/0000634 A1* | 1/2015 | Martin | F02D 41/0055 123/323 |
| 2016/0176403 A1* | 6/2016 | Weston | B60W 30/162 701/96 |

* cited by examiner

VACUUM AND COMPRESSION RELEASE BRAKING IN SPARK-IGNITED ENGINES

CROSS-REFERENCE TO RELATED APPLICATION

The present application claims the benefit of the filing date of U.S. Provisional Application Ser. No. 62/698,514 filed on Jul. 16, 2018, which is incorporated herein by reference.

BACKGROUND

The present invention relates to operation of an internal combustion engine system, and more particularly, but not exclusively, relates to vacuum and compression release braking in a spark-ignited internal combustion engine.

Vacuum braking in a spark-ignited engine occurs when the throttle is released. When the throttle is actuated, a valve opens in the engine intake, allowing air to enter the intake manifold to be mixed with fuel for combustion. When the throttle is released, the valve shuts and only a small amount of air is able to pass through to the engine. The sudden closing of the intake air passage forms a vacuum within the intake manifold, which produces an opposing force to the pistons reciprocating in the cylinders. The effort exerted by the pistons to oppose the vacuum in the intake manifold slows the pistons down and causes the crankshaft to rotate slower, reducing road speed. This braking effect is greater at higher speeds since the amount of air entering the intake manifold is reduced from a greater intake flow, creating a larger vacuum to oppose the rotational forces than the vacuum created at lower speeds.

Compression release braking is a common feature in diesel engines. Compression release braking involves opening the exhaust valve(s) of the cylinder near top dead center (TDC) of the compression stroke of the piston. This releases a portion of the compressed air trapped in the cylinder into the exhaust manifold, resulting in a volumetric efficiency reduction and subsequent torque absorption that can help to slow the vehicle. A compression release braking system allows the engine to produce significant negative torque that can be used to avoid dangerous driving conditions and reduce the wear and extend the life of the vehicles service or friction brakes.

However, vacuum and compression release braking have not been effectively employed together for engine braking purposes, such as in a spark-ignited engine. Thus, there is a continuing demand for further contributions in this area of technology.

SUMMARY

Certain embodiments of the present application includes unique systems, methods and apparatus for braking of an internal combustion engine using vacuum braking and/or compression release braking in response to one or more braking conditions. Other embodiments include unique apparatus, devices, systems, and methods involving the control of an internal combustion engine system via combined vacuum and compression release braking for a spark ignited internal combustion engine.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF REPRESENTATIVE EMBODIMENTS

Figure 1:
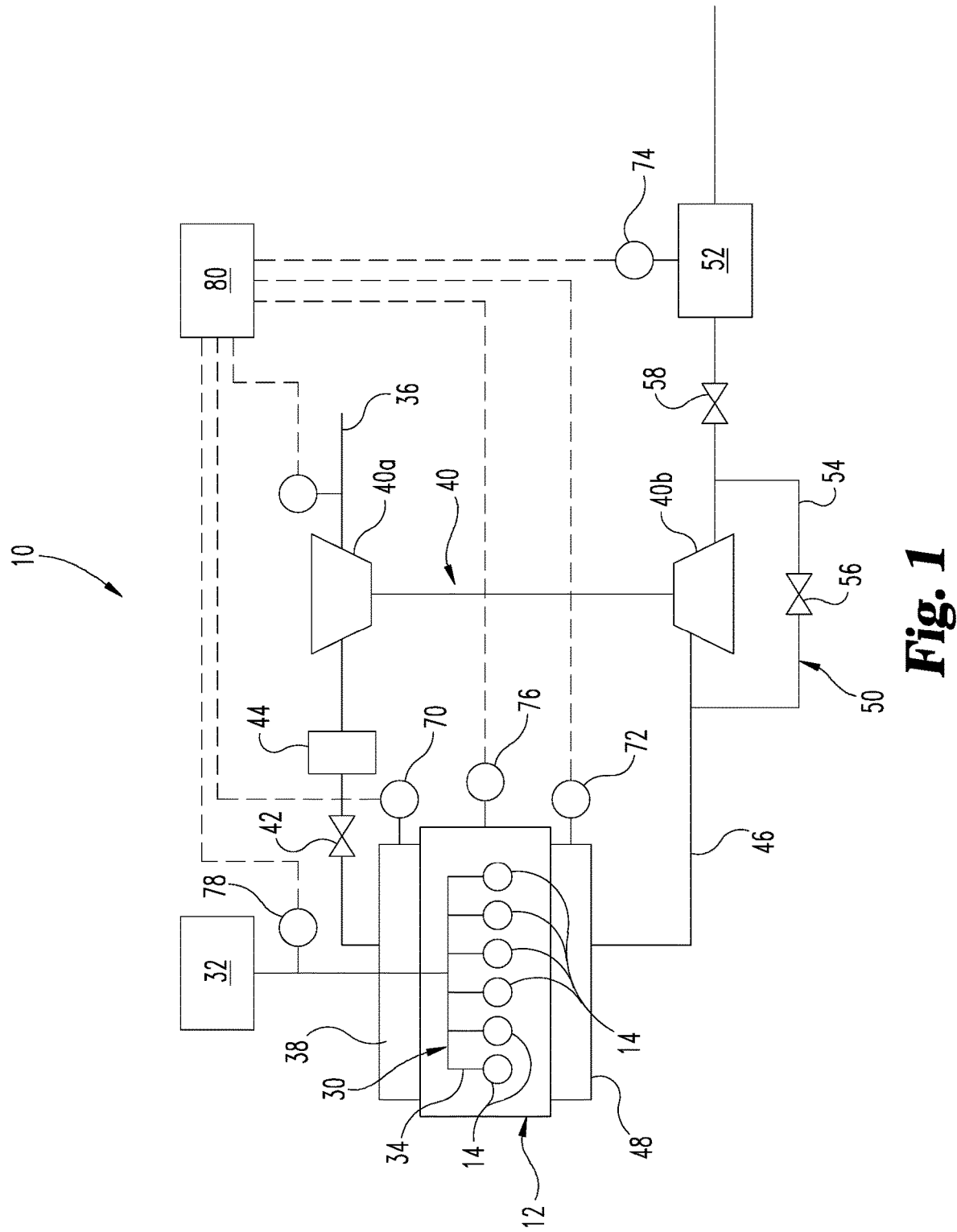
FIG. 1 is a schematic view of one embodiment of an internal combustion engine system operable to provide compression release braking and vacuum braking.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

Figure 2:
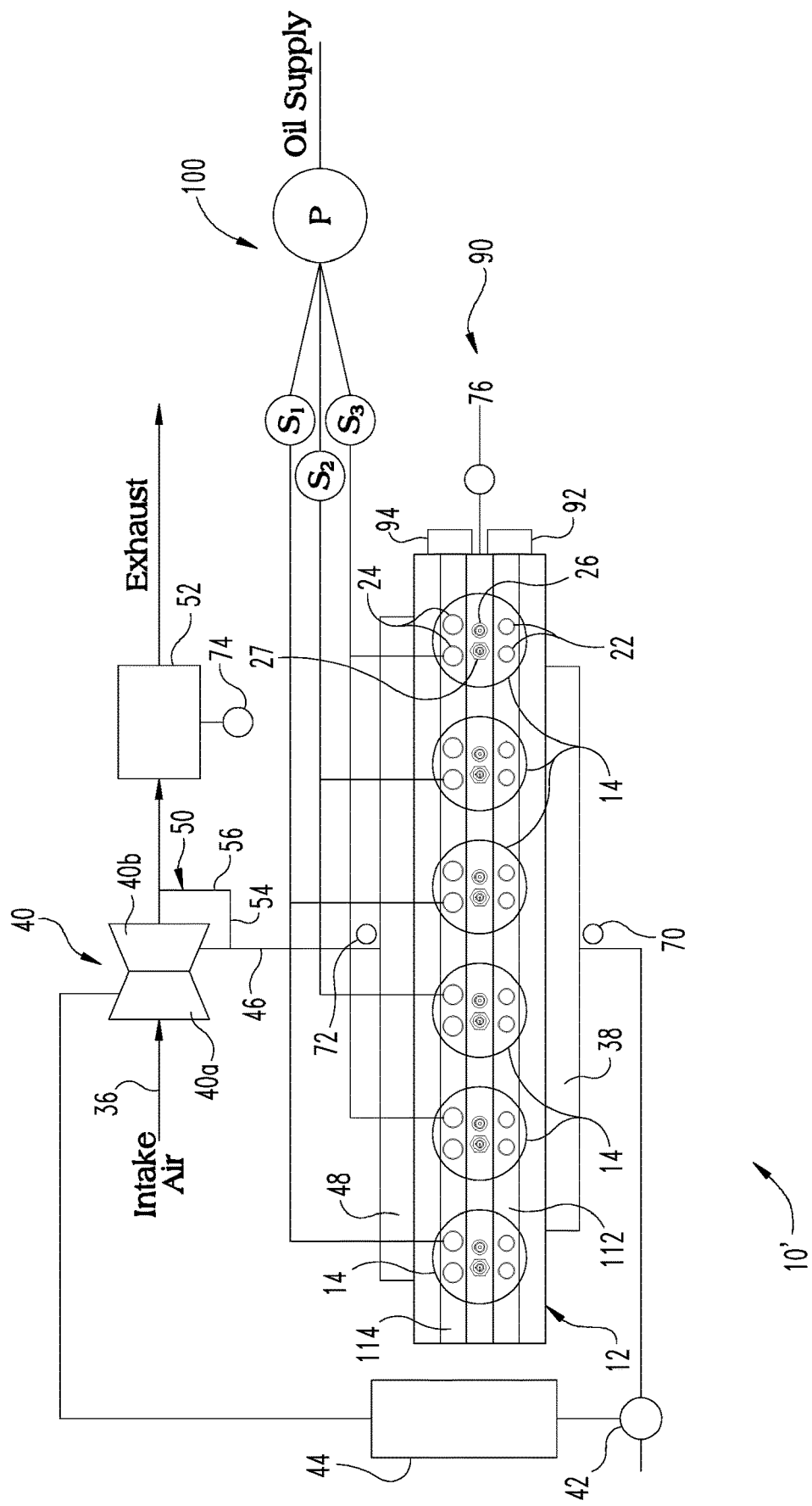
FIG. 2 is another schematic view of the internal combustion engine system of FIG. 1 showing a valve train arrangement and cam phasers operable to provide compression release braking.

With reference to FIGS. 1 and 2, an internal combustion engine system 10, 10' includes a four stroke internal combustion engine 12. Internal combustion engine systems 10, 10' can be substantially identical to one another, but some arrangements of components and detail in FIGS. 1 and 2 differ from one another as discussed further below. Like components of systems 10, 10' are designated with the same reference numerals, and the arrangements and/or details of any components of one of the systems 10, 10' may be incorporated into the other and vice versa.

In one embodiment, engine 12 is a spark-ignition engine that includes a plurality of cylinders 14. FIGS. 1 and 2 illustrate the plurality of cylinders 14 in an arrangement that includes six cylinders 14 in an in-line arrangement for illustration purposes only. Any number of cylinders and any arrangement of the cylinders suitable for use in an internal combustion engine can be utilized. The number of cylinders 14 that can be used can range from two cylinders to eighteen or more. Furthermore, the following description at times will be in reference to one of the cylinders 14. It is to be realized that corresponding features in reference to the cylinder 14 described in FIG. 3 and at other locations herein can be present for all or a subset of the other cylinders 14 of engine 12 unless noted otherwise.

Figure 3:
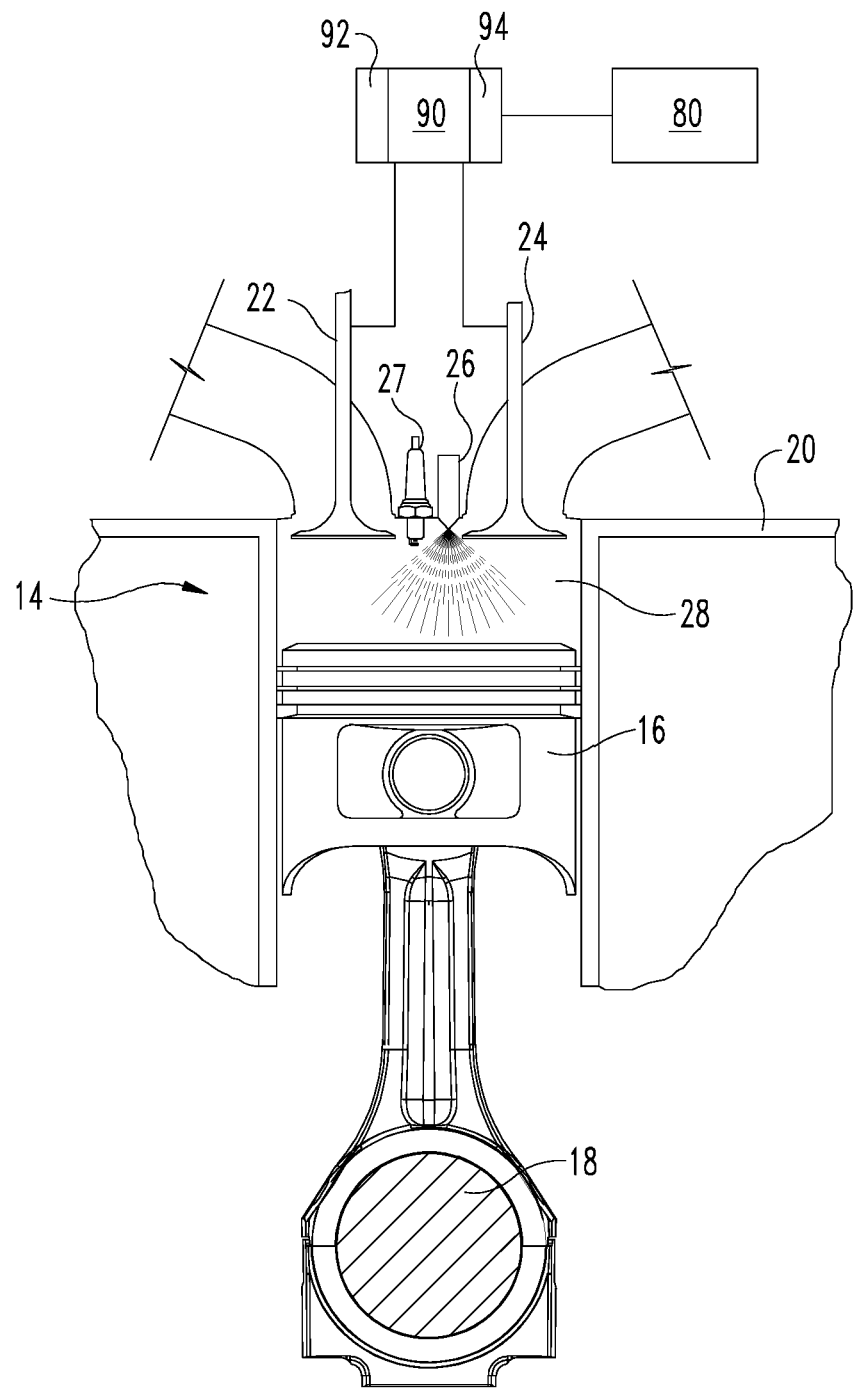
FIG. 3 is a diagrammatic and schematic view of one embodiment of a cylinder of the internal combustion engine systems of FIGS. 1 and 2 and a schematic of a valve actuation mechanism for compression release braking.
Figure 4:
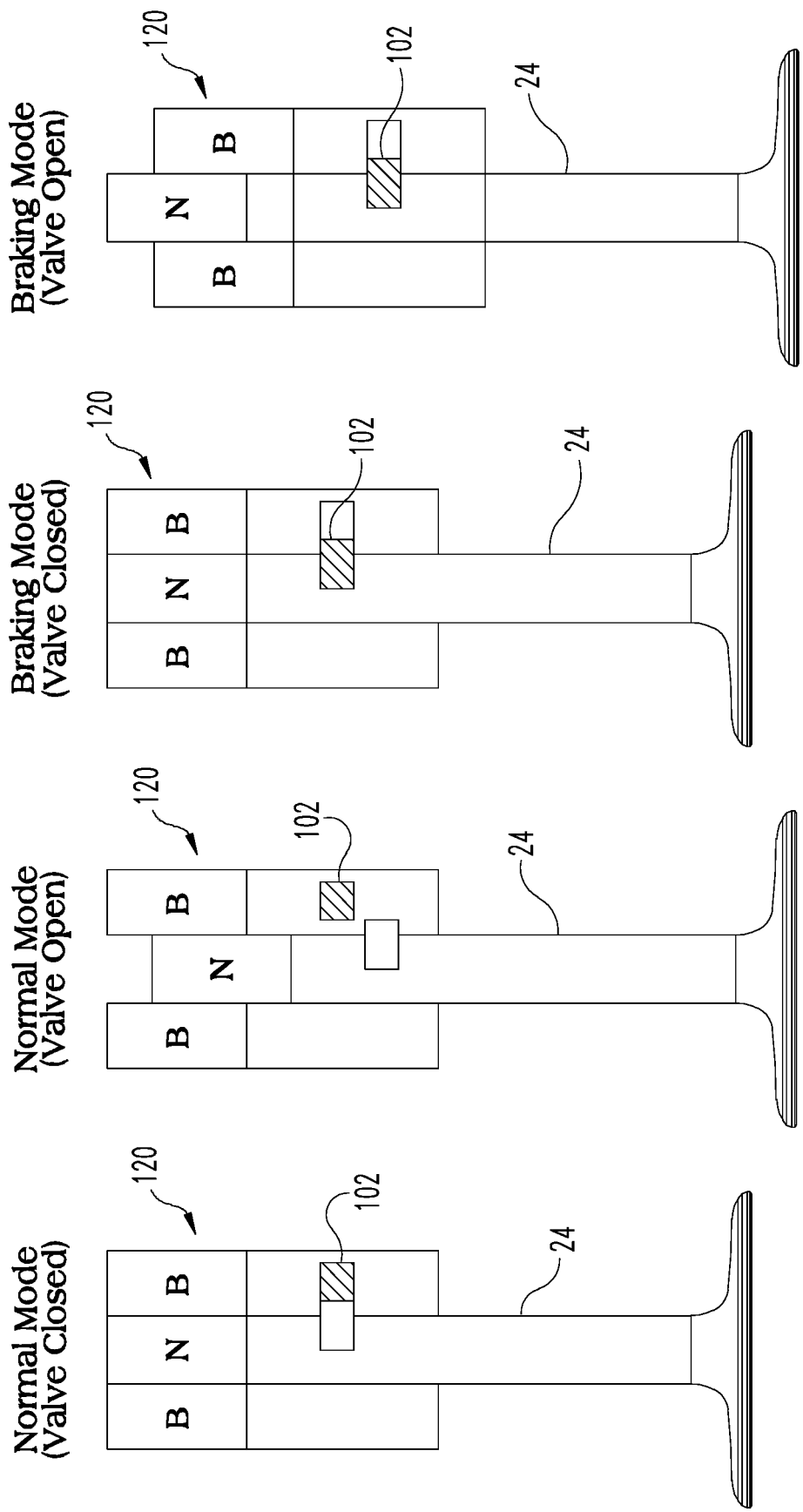
FIGS. 4A-4D are diagrammatic views showing an exhaust valve and exhaust valve actuation mechanism in various modes of operation.

As shown in FIG. 3, the cylinder 14 houses a piston 16 that is operably attached to a crankshaft 18 that is rotated by reciprocal movement of piston 16 in a combustion chamber 28 of the cylinder 14. Within a cylinder head 20 of the cylinder 14, there is at least one intake valve 22, at least one exhaust valve 24, and a fuel injector 26 that provides fuel to the combustion chamber 28 formed by cylinder 14 between the piston 16 and the cylinder head 20. In other embodiments, fuel can be provided to combustion chamber 28 by port injection, or by injection in the intake system, upstream of combustion chamber 28. Furthermore, as also shown in FIG. 2, and in the discussion that follows, each cylinder 14 includes two intake valves 22 and two exhaust valves 24. Each cylinder 14 may also include a suitable ignition device 27 such as a spark plug to ignite fuel in the combustion chamber 28.

The term "four stroke" herein means the following four strokes—intake, compression, power, and exhaust—that the piston 16 completes during two separate revolutions of the engine's crankshaft 18, which is a combustion cycle. A stroke begins either at a top dead center (TDC) when the piston 16 is at the top of cylinder head 20 of the cylinder 14, or at a bottom dead center (BDC), when the piston 16 has reached its lowest point in the cylinder 14.

The two intake valves 22 and the two exhaust valves 24 operate according to a nominal intake and exhaust valve opening and closing profile during a combustion cycle. During the intake stroke for intake valves 22, the piston 16 descends away from cylinder head 20 of the cylinder 14 to a bottom (not shown) of the cylinder, thereby reducing the pressure in the combustion chamber 28 of the cylinder 14. A combustion charge is created in the combustion chamber 28 by an intake of air through the intake valves 22 when the intake valves 22 are opened.

The fuel from the fuel injector 26 is supplied by, for example, a high pressure common-rail system 30 (FIG. 1) that is connected to the fuel tank 32. Fuel from the fuel tank 32 is suctioned by a fuel pump (not shown) and fed to the common-rail fuel system 30. The fuel fed from the fuel pump is accumulated in the common-rail fuel system 30, and the accumulated fuel is supplied to the fuel injector 26 of each cylinder 14 through a fuel line 34. The accumulated fuel in common rail system can be pressurized to boost and control the fuel pressure of the fuel delivered to combustion chamber 28 of each cylinder 14. However, any type of fuel delivery system is contemplated.

During the compression stroke in the nominal braking mode of operation, the intake valves 22 and the exhaust valves 24 are closed. The piston 16 returns toward TDC and fuel is injected near TDC in the compressed air in a main injection event, and the compressed fuel-air mixture ignites in the combustion chamber 28 after a short delay. The ignition of the air and fuel causes a rapid increase in pressure in the combustion chamber 28, which is applied to the piston 16 during its power stroke toward the BDC. Combustion phasing in combustion chamber 28 is calibrated so that the increase in pressure in combustion chamber 28 pushes piston 16, providing a net positive in the force/work/power of piston 16.

During the exhaust stroke, the piston 16 is returned toward TDC while the exhaust valves 24 are open. This action discharges the burnt products of the combustion of the fuel in the combustion chamber 28 and expels the spent fuel-air mixture (exhaust gas) out through the exhaust valves 24. The next combustion cycle occurs using these same intake and exhaust valve opening closing profiles, unless a cylinder deactivation condition or a braking condition is determined, as discussed further below.

Referring back to FIGS. 1 and 2, the intake air flows through an intake passage 36 and intake manifold 38 before reaching the intake valves 22. The intake passage 36 may be connected to a compressor 40a of a turbocharger 40 and an intake throttle 42. The intake air can be purified by an air cleaner (not shown), compressed by the compressor 40a and then aspirated into the combustion chamber 28 through the intake throttle 42. The intake throttle 42 can be controlled to influence the air flow into the cylinder and, as discussed further below, to vary the engine braking provided during vacuum braking and compression release braking operations.

The intake passage 36 can be further provided with a cooler 44 that is provided downstream of the compressor 40a. In one example, the cooler 44 can be a charge air cooler (CAC). In this example, the compressor 40a can increase the temperature and pressure of the intake air, while the CAC 44 can increase a charge density and provide more air to the cylinders. In another example, the cooler 44 can be a low temperature aftercooler (LTA). The CAC 44 uses air as the cooling media, while the LTA uses coolant as the cooling media.

The exhaust gas flows out from the combustion chamber 28 into an exhaust passage 46 from an exhaust manifold 48 that connects the cylinders 14 to exhaust passage 46. The exhaust passage 46 is connected to a turbine 40b and a wastegate 50 of the turbocharger 40 and then into an aftertreatment system or device 52. The exhaust gas that is discharged from the combustion chamber 28 drives the turbine 40b to rotate. The wastegate 50 is a device that enables part of the exhaust gas to by-pass the turbine 40b through a passageway 54. Less exhaust gas energy is thereby available to the turbine 40b, leading to less power transfer to the compressor 40a. Typically, this leads to reduced intake air pressure rise across the compressor 40a and lower intake air density/flow. The wastegate 50 can include a control valve 56 that can be an open/closed (two position) type of valve, or a full authority valve allowing control over the amount of by-pass flow, or anything between. The exhaust passage 46 can further or alternatively include an exhaust throttle 58 (FIG. 1) for adjusting the flow of the exhaust gas through the exhaust passage 46. The exhaust gas, which can be a combination of by-passed and turbine flow, then enters the aftertreatment system/device 52.

Optionally, a part of the exhaust gas can be recirculated into the intake system via an EGR passage (not shown.) The EGR passage can be connected the exhaust passage upstream of the turbine 40b to the intake passage 36 downstream of the intake air throttle 42. Alternatively or additionally, a low pressure EGR system (not shown) can be provided downstream of turbine 40b and upstream of compressor 40a. An EGR valve can be provided for regulating the EGR flow through the EGR passage. The EGR passage can be further provided with an EGR cooler and a bypass around the EGR cooler.

The aftertreatment system or device 52 may include one or more devices useful for handling and/or removing material from exhaust gas that may be harmful constituents, including carbon monoxide, nitric oxide, nitrogen dioxide, hydrocarbons, and/or soot in the exhaust gas. In some examples, the aftertreatment system or device 52 can include at least one of a catalytic device and a particulate matter filter. The catalytic device can be, for example, a selective catalytic reduction (SCR) device, three-way catalyst (TWC), lean NOX trap (LNT) etc.

A controller 80 (FIG. 1) is provided to receive data as input from various sensors, and send command signals as output to various actuators. Some of the various sensors and actuators that may be employed are described in detail below. The controller 80 can include, for example, a processor, a memory, a clock, and an input/output (I/O) interface.

The system 10 includes various sensors such as an intake manifold pressure/temperature sensor 70, an exhaust manifold pressure/temperature sensor 72, one or more aftertreatment sensors 74 (such as a differential pressure sensor, temperature sensor(s), pressure sensor(s), constituent sensor(s)), engine sensors 76 (which can detect the air/fuel ratio of the air/fuel mixture supplied to the combustion chamber, a crank angle, the rotation speed of the crankshaft, etc.), and a fuel sensor 78 (FIG. 1) to detect the fuel pressure and/or other properties of the fuel, common rail 38 and/or fuel injector 26. Any other sensors known in the art for an engine system are also contemplated.

System 10, 10' can also include various actuators for opening and closing the intake valves 22, for opening and closing the intake valves 22 and the exhaust valves 24, for injecting fuel from the fuel injector 26, for opening and closing the wastegate valve 56, for the intake throttle 42, and/or for the exhaust throttle 58. The actuators are not illustrated in FIGS. 1 and 2, but one skilled in the art would know how to implement the mechanism needed for each of the components to perform the intended function. Furthermore, in one embodiment, the actuators for opening and closing the intake and exhaust valves 22, 24 is a valve actuation (VA) system 90, such as shown schematically in FIG. 3. In one embodiment, such as shown in FIG. 2, the VA system 90 includes an intake cam phaser 92 for the intake cams (not shown) to control the opening and closing profile of the intake valves 22 and an exhaust cam phaser 94 for the exhaust cams (not shown) for controlling the opening and closing profile of the exhaust valves 24.

Referring further to FIGS. 4A-4D, a schematic of one embodiment of a part of VA system 90 is shown that is operable to provide compression release braking for the exhaust valves of the cylinders 14 in response to compression release braking conditions. Specifically, the VA system 90 includes a cam arrangement 120 that is controlled by the exhaust cam phaser 94 to engage the cam lobes N with the exhaust valves 24 of the cylinders 14 to provide a nominal lift profile for the valve closed (FIG. 4A) and valve open (FIG. 4B) positions. The cam arrangement 120 of VA system 90 is also controlled by exhaust cam phaser 94 to engage the cam lobes B with the exhaust valves 24 of the cylinders 14 to provide a compression release braking profile that can be used for compression release braking or compression release during non-braking conditions, such as during engine cranking or to ventilate the engine, combustion chambers, or aftertreatment system/device.

VA system 90 may include a valve train assembly that utilizes an intake camshaft 112 for controlling the intake valves 22 and an exhaust camshaft 114 for controlling the exhaust valves 24. The intake camshaft 112 includes intake cams with camshaft lobes (not shown) that are connected to the intake valves 22. The exhaust camshaft 114 includes exhaust cam arrangements 120 with camshaft lobes N, B that are connected to the exhaust valves 24 with a tappet or other suitable arrangement. In other embodiments, a concentric camshaft and/or rocker lever arrangement can be used for the intake and exhaust valves opening and closing.

Phasers 92, 94 can be used to control the phase angle of the intake camshaft lobes and/or to control the phase angle of the exhaust camshaft lobes of cam arrangements 120. Camshafts 112, 114 can be controlled independently of one another to vary a position of the respective camshaft lobes with respect to the tappet arrangements. For example, the tappet arrangements of one of the exhaust valves 24 for each cylinder 14 can be controlled for compression release braking with an oil supply system 100 that actuates a switching mechanism 102 (FIGS. 4A-4D) that selectively connects the exhaust valves 24 for opening and closing with the nominal cam lobes N or the compression release braking cam lobes B. The oil supply system 100 can include an pressure pump P and solenoids $S_1$, $S_2$, and $S_3$ to selectively control the oil supply pressure to the switching mechanism 102 of the exhaust valves 24.

Figure 5:
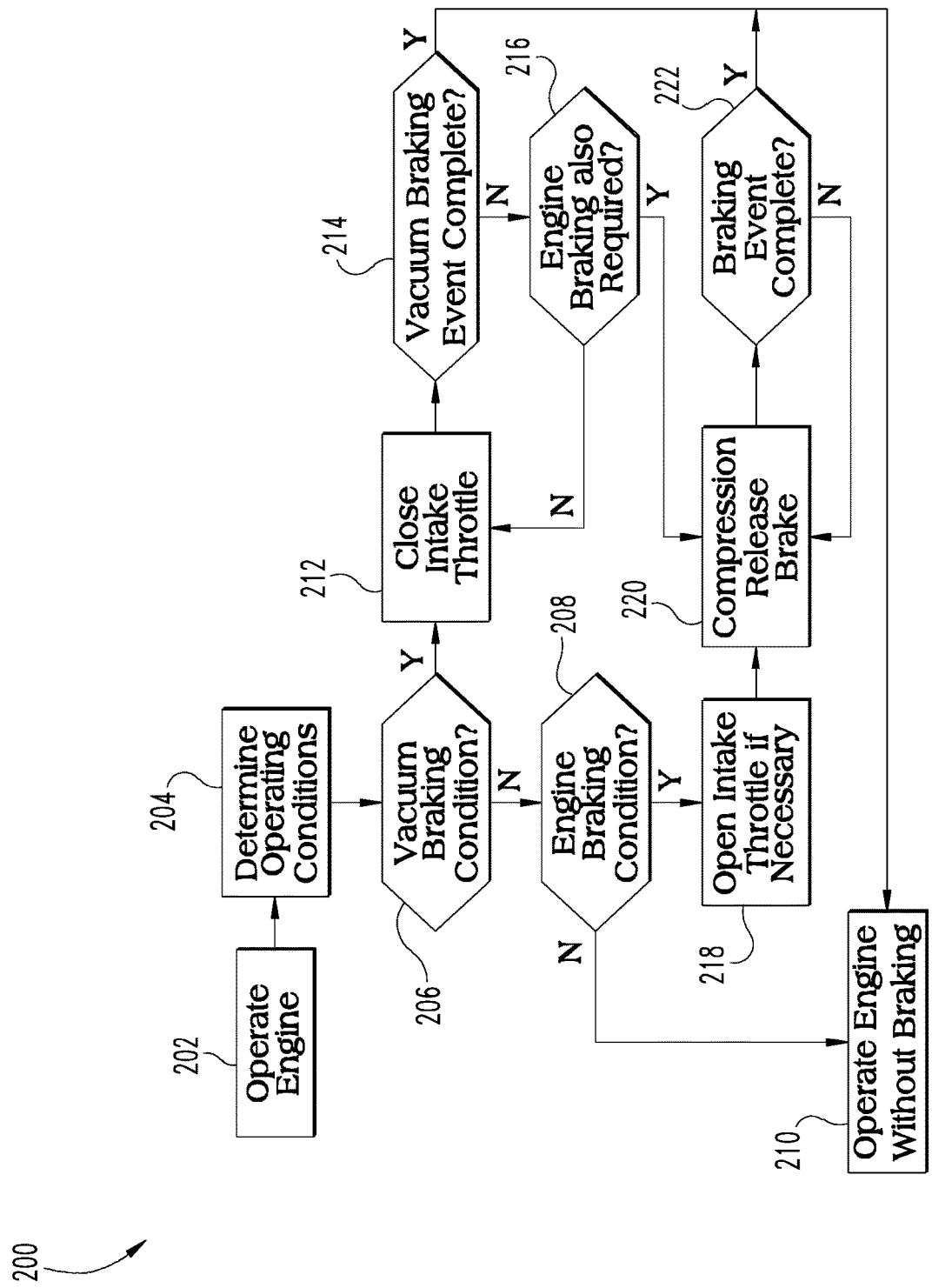
FIG. 5 is a flow diagram of one embodiment of a procedure for operation of the internal combustion engine systems of FIGS. 1-3 to provide compression release braking and vacuum braking.

Referring to FIG. 5, a flow diagram of one embodiment of a procedure 200 for vacuum braking and/or compression release engine braking is provided. The procedure 200 includes an operation 202 that includes operating the internal combustion engine system 10, 10' including internal combustion engine 12 with a plurality of cylinders 14 that receive a charge flow from intake passage 36. Furthermore, at least a portion of the plurality of cylinders 14 receives fuel from fuel system 30 in response to a vehicle or engine speed request.

Procedure 200 continues at operation 204 to determine operating conditions for the internal combustion engine. The operating conditions can include any one or more parameters indicative of a vacuum braking condition and/or an engine braking condition being present or complete. The operating conditions may also include one or more conditions in which vacuum and/or compression release braking is prevented. Procedure 200 continues at conditional 206 to determine the presence or absence of a vacuum braking condition. If conditional 206 is negative, procedure 200 continues at conditional 208 to determine if an engine braking condition is absent or present. If conditional 208 is negative, procedure 200 continues at operation 210 to operate without vacuum or compression release braking. Procedure 200 can restart from operation 210 and/or continue to monitor for operating conditions.

In response to conditional 206 being positive indicating a vacuum braking condition is present, procedure 200 continues at operation 212 to close the intake throttle 42 to provide vacuum braking. Conditions for vacuum braking may include, for example, the vehicle speed being less than a speed threshold, a gear selection of the vehicle being in a low gear state or less than a gear number threshold, a location of the vehicle (such as whether a noise ordnance at the location prevents compression release braking), and weather/road conditions. Vacuum braking may also be excluded or prevented in response an anti-lock brake system being operational or an indication of rain or icy conditions. Procedure 200 continues at conditional 214 to determine if the vacuum braking event is complete. If conditional 214 is negative, procedure 200 continues at conditional 216 to determine if compression release engine braking is also required. If conditional 216 is negative, procedure 200 continues at operation 212 to continue to provide vacuum braking with the intake throttle is closed and without compression release braking. If conditional 216 is positive, procedure 200 continues at operation 220, as discussed further below. If conditional 214 is positive, procedure 200 continues at operation 210.

If conditional 208 is positive, procedure 200 continues at operation 218 to open the intake throttle 42, if necessary, and then continues at operation 220 to provide compression release (CR) braking with cylinders 14. The determination of the engine braking request conditions being present can result from, for example, the vehicle speed being greater than a speed threshold, the gear selection being in a high gear, the terrain (such as a downhill condition being present), and weather conditions such as rain or ice. Furthermore, if the vehicle is currently operating in a vacuum braking mode, then the intake throttle 42 is transitioned to an open condition at operation 218 to eliminate the vacuum condition before initiating the compression release braking mode of operation. Procedure 200 continues from operation 220 at conditional 222 to determine if the braking event is complete. If conditional 222 is negative, compression release braking continues at operation 220. If conditional 222 is positive, procedure 200 continues at operation 210.

In certain embodiments, conditional 216 includes determining conditions are present to provide compression release braking in addition to vacuum braking. For example, an input from a vehicle operator such as a brake pedal position being more than a threshold, or a signal from an accident avoidance system, can result in compression release braking being applied in addition to vacuum braking. This yields an incremental increase in the braking power that may be useful in an emergency stop scenario.

During operation of the internal combustion engine system 10, 10', the controller 80 can receive information from the various sensors listed above through I/O interface(s), process the received information using a processor based on an algorithm stored in a memory of the controller 80, and then send command signals to the various actuators through the I/O interface. For example, the controller 80 can receive information or inputs regarding a vacuum braking condition or an engine braking condition/request, a vehicle or engine speed request, an ABS event, weather/terrain/road conditions, a ventilation requirement for the intake manifold/combustion chamber/aftertreatment device, and/or an engine load condition. The controller 80 is configured to process the requests and/or input(s), and then based on the control strategy, such as procedure 200 discussed above, send one or more command signals to one or more actuators to provide vacuum braking using the intake throttle 42 and/or compression release braking using the associated engine braking cam lobes.

In one embodiment, the adjustment of the intake throttle position can be used as a means to target the CR braking performance. For example, if a maximum amount of CR braking performance is needed, then intake throttle 42 is positioned to a fully open position. If less than maximum CR braking performance is needed or desired, the intake throttle 42 is adjusted in a manner to restrict intake air flow, to restrict or 'throttle' the CR braking performance. As a further potential example, the throttle adjustment of intake throttle 42 could be employed to maintain a downhill vehicle speed during CR braking.

The control procedures implemented by the controller 80 can be executed by a processor of controller 80 executing program instructions (algorithms) stored in the memory of the controller 80. The descriptions herein can be implemented with internal combustion engine system 10, 10'. In certain embodiments, the internal combustion engine system 10 further includes a controller 80 structured or configured to perform certain operations to control internal combustion engine system 10, 10' in achieving one or more target conditions. In certain embodiments, the controller forms a portion of a processing subsystem including one or more computing devices having memory, processing, and communication hardware. The controller may be a single device or a distributed device, and the functions of the controller 80 may be performed by hardware and/or by instructions encoded on a computer readable medium.

In certain embodiments, the controller 80 includes one or more modules structured to functionally execute the operations of the controller. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on a non-transient computer readable storage medium, and modules may be distributed across various hardware or other computer components.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted or determined parameter can be calculated, and/or by referencing a default value that is interpreted or determined to be the parameter value.

Various aspects of the present disclosure are contemplated as described herein and/or as recited in the claims. According to one aspect, a method includes operating a spark-ignited internal combustion engine system including an internal combustion engine with a plurality of cylinders that receive an intake flow that is provided to at least a portion of the plurality of cylinders through an open intake throttle, and adjusting the intake throttle while operating the internal combustion engine in a compression release braking mode of operation.

According to another aspect, a method includes operating a spark-ignited internal combustion engine system including an internal combustion engine with a plurality of cylinders that receive an intake flow that is provided to at least a portion of the plurality of cylinders through an open intake throttle, and selecting between a vacuum braking mode of operation and a compression release braking mode of operation in response to one or more engine operating conditions.

In another aspect, a method includes operating a spark-ignited internal combustion engine system including an internal combustion engine with a plurality of cylinders that receive an intake flow that is provided to at least a portion of the plurality of cylinders through an open intake throttle, closing the intake throttle to operate in a vacuum braking mode in response to a braking condition, and adjusting at least an exhaust valve opening and closing timing of one or more of the plurality of cylinders to operate in a compression release braking mode in response to the braking condition.

In one embodiment, the method includes opening the intake throttle after closing the intake throttle to transition from the vacuum braking mode to the compression release braking mode. In another embodiment, the method includes disabling the compression release braking mode in response to one or more of an anti-lock braking event and a weather event. In yet another embodiment, the method includes initiating the compression release braking mode to ventilate one or more of the intake manifold, a combustion chamber of one or more of the plurality of the cylinders, and an aftertreatment system.

In another embodiment, the compression release braking mode is initiated in response to an engine braking request. In a refinement of this embodiment, the engine braking request is provided by at least one of: a driver input; and an accident avoidance system request.

According to another aspect, a system includes an internal combustion engine including a plurality of cylinders that receive an intake flow through intake throttle of an intake system and an exhaust system for receiving exhaust gas produced by combustion of a fuel provided to at least a portion of the plurality of cylinders. The system also includes a plurality of sensors operable to provide signals indicating operating conditions of the system, a valve actuation mechanism configured to control an opening and closing timing of exhaust valves associated with the plurality of cylinders, and a controller connected to the plurality of sensors operable to interpret one or more signals from the plurality of sensors. The controller, in response to a braking condition, is configured to control the intake throttle to provide a vacuum braking mode of operation and to control the valve actuation mechanism to adjust a timing of an exhaust valve opening and an exhaust valve closing of at least a part of the plurality of cylinders to provide a compression release braking mode of operation.

In one embodiment, the controller is configured open the intake throttle after closing the intake throttle to transition from the vacuum braking mode of operation to the compression release braking mode of operation. In another embodiment, the controller is configured to initiate the compression release braking mode of operation in response to a braking request. In a refinement of this embodiment, the braking request is provided by at least one of an input from a driver and an input from an accident avoidance system.

In another embodiment, the controller is configured to disable the compression release braking mode in response to one or more of an anti-lock braking event and a weather event. In yet another embodiment, the controller is configured to initiate the compression release braking mode to ventilate one or more of the intake manifold, a combustion chamber of one or more of the plurality of the cylinders, and an aftertreatment device in the exhaust system. In still another embodiment, the valve actuation mechanism includes an exhaust camshaft phaser connected to an exhaust camshaft.

According to another aspect, an apparatus includes a controller for connection to a plurality of sensors configured to interpret signals from the plurality of sensors associated with operation of an internal combustion engine. The controller is configured to determine a braking condition and provide a vacuum braking command to close an intake throttle of the internal combustion engine in response to the braking condition. The controller is further configured to provide a compression release braking command to adjust a timing of an exhaust valve opening and an exhaust valve closing of at least a part of a plurality of cylinders of the internal combustion engine to provide compression release braking.

In one embodiment, the controller, in response to the braking condition, is configured to provide vacuum braking command to close the intake throttle, and, with the intake throttle closed and in response to a braking request, provide the compression release braking command to increase the braking amount from vacuum braking. In one refinement of this embodiment, the controller is configured to determine the compression release braking condition in response to a braking request. In a further refinement, the braking request is provided by at least one of an input from a driver and an input from an accident avoidance system.

In another embodiment, the controller, in response to the braking condition, is configured to provide the vacuum braking command to close the intake throttle to provide vacuum braking in response to the braking condition; determine a compression release braking condition; provide a second vacuum braking command to open the intake throttle in response to the compression release braking condition; and, with the intake throttle open, provide the compression release braking command to increase the braking amount from that provided by vacuum braking.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    operating a spark-ignited internal combustion engine system including an internal combustion engine with a plurality of cylinders that receive an intake flow that is provided to at least a portion of the plurality of cylinders through an open intake throttle;
    closing the intake throttle to operate in a vacuum braking mode in response to a braking condition; and
    adjusting at least an exhaust valve opening and closing timing of one or more of the plurality of cylinders to operate in a compression release braking mode in response to the braking condition.

2. The method of claim 1, further comprising opening the intake throttle after closing the intake throttle to transition from the vacuum braking mode to the compression release braking mode.

3. The method of claim 1, wherein the compression release braking mode is initiated in response to an engine braking request.

4. The method of claim 3, wherein the engine braking request is provided by at least one of:
    a driver input; and
    an accident avoidance system request.

5. The method of claim 1, further comprising disabling the compression release braking mode in response to one or more of an anti-lock braking event and a weather event.

6. The method of claim 1, further comprising initiating the compression release braking mode to ventilate one or more of the intake manifold, a combustion chamber of one or more of the plurality of the cylinders, and an aftertreatment system.

7. A system, comprising:
    an internal combustion engine including a plurality of cylinders that receive an intake flow through intake throttle of an intake system and an exhaust system for receiving exhaust gas produced by combustion of a fuel provided to at least a portion of the plurality of cylinders;
    a plurality of sensors operable to provide signals indicating operating conditions of the system;

a valve actuation mechanism configured to control an opening and closing timing of exhaust valves associated with the plurality of cylinders; and a controller connected to the plurality of sensors operable to interpret one or more signals from the plurality of sensors, wherein the controller, in response to a braking condition, is configured to control the intake throttle to provide a vacuum braking mode of operation and to control the valve actuation mechanism to adjust a timing of an exhaust valve opening and an exhaust valve closing of at least a part of the plurality of cylinders to provide a compression release braking mode of operation.

8. The system of claim 7, wherein the controller is configured open the intake throttle after closing the intake throttle to transition from the vacuum braking mode of operation to the compression release braking mode of operation.

9. The system of claim 7, wherein the controller is configured to initiate the compression release braking mode of operation in response to a braking request.

10. The system of claim 9, wherein the braking request is provided by at least one of:
an input from a driver; and
an input from an accident avoidance system.

11. The system of claim 7, wherein the controller is configured to disable the compression release braking mode in response to one or more of an anti-lock braking event and a weather event.

12. The system of claim 7, wherein the controller is configured to initiate the compression release braking mode to ventilate one or more of the intake manifold, a combustion chamber of one or more of the plurality of the cylinders, and an aftertreatment device in the exhaust system.

13. The system of claim 7, wherein the valve actuation mechanism includes an exhaust camshaft phaser connected to an exhaust camshaft.

14. An apparatus, comprising:
a controller for connection to a plurality of sensors configured to interpret signals from the plurality of sensors associated with operation of an internal combustion engine, wherein the controller is further configured to determine a braking condition and provide a vacuum braking command to close an intake throttle of the internal combustion engine in response to the braking condition, and wherein the controller is further configured to provide a compression release braking command to adjust a timing of an exhaust valve opening and an exhaust valve closing of at least a part of a plurality of cylinders of the internal combustion engine to provide compression release braking.

15. The apparatus of claim 14, wherein the controller, in response to the braking condition, is configured to:
provide vacuum braking command to close the intake throttle; and
with the intake throttle closed and in response to a braking request, provide the compression release braking command to increase the braking amount from vacuum braking.

16. The apparatus of claim 15, wherein the controller is configured to determine the compression release braking condition in response to a braking request.

17. The apparatus of claim 16, wherein the braking request is provided by at least one of:
an input from a driver; and
an input from an accident avoidance system.

18. The apparatus of claim 14, wherein the controller, in response to the braking condition, is configured to:
provide the vacuum braking command to close the intake throttle to provide vacuum braking in response to the braking condition;
determine a compression release braking condition;
provide a second vacuum braking command to open the intake throttle in response to the compression release braking condition; and
with the intake throttle open, provide the compression release braking command to increase the braking amount from that provided by vacuum braking.

19. A method, comprising:
operating a spark-ignited internal combustion engine system including an internal combustion engine with a plurality of cylinders that receive an intake flow that is provided to at least a portion of the plurality of cylinders through an open intake throttle; and
adjusting the intake throttle position while operating the internal combustion engine in a compression release braking mode of operation.

20. A method, comprising:
operating a spark-ignited internal combustion engine system including an internal combustion engine with a plurality of cylinders that receive an intake flow that is provided to at least a portion of the plurality of cylinders through an open intake throttle; and
selecting between a vacuum braking mode of operation and a compression release braking mode of operation in response to one or more engine operating conditions.

* * * * *